United States Patent [19]

McConnell et al.

[11] Patent Number: 4,551,521

[45] Date of Patent: Nov. 5, 1985

[54] LOW-MELTING COPOLYESTER ADHESIVES

[75] Inventors: Richard L. McConnell; Abraham J. Cox, both of Kingsport, Tenn.; William R. Darnell, Weber City, Va.

[73] Assignee: Eastman Kodak Company, Rochester, N.Y.

[21] Appl. No.: 686,503

[22] Filed: Dec. 26, 1984

[51] Int. Cl.$^4$ .............................................. C08G 63/16
[52] U.S. Cl. .................................... 528/302; 528/307; 528/308; 528/308.7
[58] Field of Search ............. 528/302, 307, 308, 308.7

[56] References Cited

U.S. PATENT DOCUMENTS

| 4,062,907 | 12/1977 | Sublett | 528/302 X |
| 4,107,150 | 8/1978 | Campbell et al. | 528/302 X |
| 4,393,121 | 7/1983 | Tobias et al. | 528/302 X |
| 4,398,022 | 8/1983 | Sublett | 528/302 |

Primary Examiner—Lucille M. Phynes
Attorney, Agent, or Firm—John F. Stevens; William P. Heath, Jr.

[57] ABSTRACT

A linear, essentially crystalline, thermoplastic copolyester having an I.V. of about 0.4–1.2 and a melting point of about 60°–130° C., said copolyester having repeat units from adipic acid, 1,4-cyclohexanedimethanol and about 30–0.5 mole % of aliphatic coglycol having 2–8 carbon atoms, said copolyester having a bonding temperature of about 90°–120° C.

7 Claims, No Drawings

LOW-MELTING COPOLYESTER ADHESIVES

TECHNICAL FIELD

This invention relates to linear, thermoplastic, low-melting, crystalline copolyesters based primarily on adipic acid and 1,4-cyclohexanedimethanol which have inherent viscosity values of about 0.4 to about 1.2. These polymers generally have melting points in the range of about 60° to about 130° C. and they are especially useful as adhesives for the bonding of fabrics at relatively low temperatures.

BACKGROUND OF THE INVENTION

Fabric adhesives are often used on fusible interlinings, which are materials such as fabrics which have been coated on one side with a discontinuous pattern of adhesive. When the interlining is bonded to a face fabric in a garment, it provides body and shape to the garment without impairing the ability of the fabric to breathe. Fusible interlinings are used in the manufacture of suits, in shirt collars and cuffs, and in the waistbands of trousers. In the manufacture of suits, polycarbonate basting threads are frequently used to temporarily hold the parts of the suit in place. After the suit is completed, a solvent such as perchloroethylene or trichloroethylene is used to embrittle the polycarbonate thread so that it may be brushed from the fabric.

In attempting to make polyesters from linear aliphatic or cycloaliphatic dibasic acids such as adipic acid or 1,4-cyclohexanedicarboxylic acid and high boiling glycols such as 1,4-cyclohexanedimethanol, it is difficult to remove the glycol from the polymerization mixture during the build-up phase of the reaction and only low molecular weight polymers with inherent viscosity (I.V.) values of less than 0.4 are generally obtained. Such low I.V. polymers are generally not useful as adhesives for bonding fabric, plastic, metal, or wood substrates. However, according to the present invention, it has been found that small amounts of a low boiling co-glycol can be used in the polymerization mixture to make polymers with I.V. values substantially higher than 0.4. The high molecular weight copolyesters formed by this process have been found to be quite useful as adhesives for a variety of substrates. In the bonding of fabrics and other heat sensitive substrates, it is desirable to have adhesives which will melt and bond at temperatures of 120° C. or less.

Several poly(tetramethylene terephthalate) and poly(hexamethylene terephthalate) copolyesters are known and are being used as adhesives. However, it is generally not possible to use these two families of polyester adhesives at bonding temperatures less than about 120° C. Patents relating to these terephthalate-based polyester adhesives include U.S. Pat. Nos. 4,094,721 and 4,419,507.

It is also known in the art to prepare low molecular weight polymers from adipic acid and 1,4-cyclohexanedimethanol. Such materials have been disclosed to be used as an additive along with other agents in the transfer printing of cotton/polyester fabrics (German Patent Applications Nos. 2,754,175 and 2,745,597). These low molecular weight polymers have also been reacted with diisocyanates to provide polymers which are used as additives in standard epoxy resins (U.S. Pat. No. 4,000,214).

We are not aware of any prior art concerned with high molecular weight poly(1,4-cyclohexylenedimethylene adipate) polymers.

DISCLOSURE OF THE INVENTION

This invention provides new low melting, high molecular weight poly(1,4-cyclohexylenedimethylene adipate) copolyesters which contain about 0.5 to about 30 mole % modification with a co-glycol. More specifically, this invention provides a linear, essentially crystalline, thermoplastic copolyester having an I.V. of about 0.4–1.2 and a melting point of about 60°–130° C., the copolyester having repeating units from about 70.5–100 mole % adipic acid, about 29.5–0 mole % of a co-acid selected from aliphatic, cycloaliphatic or aromatic dibasic acids having 4 to 12 carbon atoms, about 70–99.5 mole % of 1,4-cyclohexanedimethanol and about 30–0.5 mole % of an aliphatic co-glycol wherein the total of the co-acid and co-glycol is no greater than about 30 mole %.

Typical co-acids which may be used include succinic, glutaric, azelaic, sebacic, 1,12-dodecanedioic, 1,4-cyclohexanedicarboxylic, 1,3-cyclohexanedicarboxylic, terephthalic, isophthalic and the like.

Typical low-boiling co-glycols include ethylene glycol, diethylene glycol, propylene glycol, 1,3-propanediol, 1,4-butanediol, 1,5-pentanediol, 1,6-hexanediol and the like.

The polymers are readily prepared using typical polycondensation techniques well known in the art. Typical polyesterification catalysts which may be used include titanium alkoxides, dibutyl tin dilaurate, and combinations of zinc, manganese, or magnesium acetates or benzoates with antimony oxide or antimony triacetate. Generally, the polycondensation temperature should not exceed about 270° C. At higher reaction temperatures, substantial polymer degradation will occur.

Useful polymers may have I.V. values ranging from about 0.4 to about 1.2 with preferred polymers having I.V. values ranging from about 0.5 to 1.1. I.V. values are determined at 25° C. in a 60/40 weight mixture of phenol/tetrachloroethane at a concentration of 0.5 g/100 mL. The polymers are also crystallizable with DSC melting points of about 60° to about 130° C. and they will generally have heats of fusion ($\Delta H_f$) of about 1 to about 12 calories/gram.

The polymers of this invention are useful as adhesives for bonding fabrics, plastics, and wood. Of special interest is their ability to bond fabric at relatively low bonding temperatures. For example, bonds on polyester or polyester/cotton fabrics are readily made in the range of about 90° to about 120° C.

Also of interest is the very low melt viscosity of the copolyesters of this invention. This low melt viscosity is of importance in applying these polymers in molten form from roller coating or gravure coating equipment such as Roto-Therm equipment. Thus, molten dots of adhesive may be applied to fabric to make fusible interlinings or molten polymer may be applied in the lamination of woven or nonwoven fabrics to face fabrics, fabric-backed vinyl, vinyl sheeting, foamed substrates and the like.

In addition, the polymers may be cryogenically ground into powders which are useful in making fusible interlinings by conventional techniques including random sprinkling, powder point, and paste printing processes.

The following examples are submitted for a better understanding of the invention.

EXAMPLE 1

A total of 87 g (0.499 mole) of dimethyl adipate, 102.9 g of 70% solution of 1,4-cyclohexanedimethanol (70% trans isomer; 30% cis isomer) in methanol (0.50 mole), 3.1 g of ethylene glycol (0.05 mole), and 100 ppm of titanium catalyst (titanium tetraisopropoxide in n-butanol) are weighed into a 500-mL, single-neck, round-bottom flask equipped with a nitrogen inlet, stirrer, vacuum outlet, and condensing flask. The flask is heated to 200° C. in a Belmont metal bath for 20 minutes with a nitrogen sweep over the reaction mixture. The temperature of the bath is then increased to 220° C. for 50 minutes. When the theoretical amount of methanol has distilled from the reaction mixture, the metal bath temperature is increased to 255° C. and the pressure in the flask is reduced to about 0.1 mm of mercury. The flask is heated at 255° C. at reduced pressure for 5 hours and 25 minutes. The flask is then removed from the bath and is allowed to cool under a nitrogen atmosphere.

The copolyester is an opaque yellow color. Gas chromatographic analysis of the polymer components after hydrolysis of the copolyester reveals the copolyester to contain the following mole percentages of reaction residues: dimethyl adipate, 100 mole %; trans 1,4-cyclohexanedimethanol, 52.8 mole %; cis 1,4-cyclohexanedimethanol, 43.7 mole %; ethylene glycol, 3.5 mole %.

The copolyester has an inherent viscosity of 0.7 dl/g. The melt viscosity of this polymer is 20,000 cP at 190° C. (measured in a Brookfield Thermosel viscometer). By DSC analysis, the polymer has a glass transition temperature (Tg) of −25° C., a melting point (Tm) of 102° C., and a heat of fusion ($\Delta H_f$) value of 9.4 cal/g.

Samples of this copolyester are compression molded on a Wabash press at 130° C. to provide translucent 4-mil films. Four-inch squares of 65/35 polyester/cotton twill fabric are bonded together using the polymer films at 90° C., 100° C., and 110° C. on a Sentinel heat sealer using 1,056 g/cm² jaw pressure and a 8-sec compression time. One-half in. is trimmed from each edge of the 4-in. square bonds and the remainder is cut into 1-in. wide strips. T-peel bond strength is determined on an Instron machine at a crosshead speed of 2 in./min. The recorded T-peel bond strength values are obtained by averaging the results from three bonded samples. The T-peel strength of the fabric bonds made at 90° C. is 0.7 pli (125 g/linear cm); for bonds made at 100° C., 8.0 pli (1,430 g/linear cm); and for bonds made at 110° C., 9.7 pli (1,734 g/linear cm).

Tensile properties measured on a 4-mil film of the polymer show that it has a modulus of 35,000 psi ($24.3 \times 10^5$ g/cm²), tensile yield strength of 1,490 psi ($1.05 \times 10^5$ g/cm²), tensile break strength of 1,500 psi ($1.06 \times 10^5$ g/cm²), and elongation of 44%.

EXAMPLE 2

The procedure of Example 1 is followed except that 6.5 g (0.105 mole) of ethylene glycol and 82.3 g of a 70% solution of 1,4-cyclohexanedimethanol (70% trans isomer; 30% cis isomer) in methanol (0.40 mole) are used. The copolyester contains the following mole percentages of reaction residues: dimethyl adipate, 100 mole %; trans 1,4-cyclohexanedimethanol, 65.0 mole %; cis 1,4-cyclohexanedimethanol, 24.9 mole %; ethylene glycol, 10.1 mole %. The polymer has an inherent viscosity of 0.9 dl/g (measured in a 60/40 phenol/tetrachloroethane solvent), a melting point of 93° C., and a heat of fusion ($\Delta H_f$) value of 6.0 cal/g. The melt viscosity of this sample is 55,000 cP at 190° C.

The copolyester is ground into powder in the presence of liquid nitrogen in a hammer mill. The powder is sieved to provide coarse (40–70 U.S. mesh), medium (70–200 U.S. mesh), and fine (<200 U.S. mesh) fractions.

The coarse powder is randomly sprinkled onto a bonded polyester nonwoven pad to give a uniform coating weight of 20 g per 930 cm². The coated pad is placed under a Watlow infrared heater for 35 seconds to give a surface temperature of 135°–150° C. (Ircon infrared temperature detector) to lightly fuse the powder. Less than 1% of the powder is unfused after this treatment.

The coated pad (15 cm × 15 cm) is bonded to a 15 cm × 15 cm fabric backed poly(vinyl chloride) sheeting on a Sentinel heat sealer (both platens heated; platens are 2.54 cm wide) at a bonding temperature of 155° C. for 10 seconds at 1,619 g/cm² gage bonding pressure to give a 15-cm wide bond. The bond is immediately quenched on a stone bench top. Three one-inch (2.54 cm) wide T-peel bonds are cut from each sample. These T-peel bonds are tested on an Instron machine at 25 cm/min crosshead speed. Bonds made with the coarse powder have a peel strength of 15 lb/in. (2,680 g/linear cm) at 23° C.

Powderpoint fusible interlinings are prepared with the medium powder on a small-scale laboratory powder-point machine. The powder is applied (20.5 g/m²) from an engraved roll to a cotton interlining fabric to form an interlining containing rows of adhesive dots across the interlining fabric (35 dots/cm²). The interlining is used to bond a polyester/cotton face fabric. The interlinings are bonded to the face fabrics by pressing four-inch squares of interlining to four-inch squares of polyester twill face fabric using an electrically heated garment press at 110° C. The bonded fabrics are laundered and dry cleaned, then cut into strips one-inch wide. T-peel strengths are determined before and after laundering and dry cleaning. The T-peel strengths reported are an average of three determinations per sample. An initial peel strength of 1.5 lb/in. (272 g/linear cm) at 23° C. (30.5 cm/min testing rate) is observed. After commercial dry cleaning, the bonds have a peel strength of 1.16 lb/in (206 g/linear cm). After laundering treatments, the bonds have a peel strength of 1.17 lb/in. (209 g/linear cm).

EXAMPLE 3

The procedure of Example 2 is followed except that ethylene glycol is replaced with 9.5 g (0.106 mole) of 1,4-butanediol. The copolyester contains the following mole percentages of reaction residues: dimethyl adipate, 100 mole %; trans 1,4-cyclohexanedimethanol, 59.5 mole %; cis 1,4-cyclohexanedimethanol; 23.9 mole %; 1,4-butanediol, 16.5 mole %. The polymer has an inherent viscosity of 0.7 dl/g, a melting point of 91° C., and a heat of fusion value of 7.4 cal/g.

Samples of this copolyester are compression molded on a Wabash press at 125° C. to provide translucent 4-mil films. Four-inch squares of 65/35 polyester/cotton twill fabric are bonded together using the polymer films as described in Example 1. The T-peel strength of the fabric bonds made at 90° C. is 7.8 pli (1,390 gm/linear cm); for bonds made at 100° C., 9.6 pli (1,720 g/linear cm), and for bonds made at 110° C., 7.9 pli (1,420 g/linear cm).

EXAMPLE 4

The procedure of Example 2 is followed except that ethylene glycol is replaced with 12.4 g (0.105 mole) of 1,6-hexanediol. The copolyester contains the following mole percentages of reaction residues: dimethyl adipate, 100 mole %; trans 1,4-cyclohexanedimethanol, 54.9 mole %; cis 1,4-cyclohexanedimethanol, 22.2 mole %; 1,6-hexanediol, 22.9 mole %. The copolyester has an inherent viscosity of 0.8 dl/g, a melting point of 91° C., and a heat of fusion value of 6.7 cal/g.

Samples of this copolyester are compression molded on a Wabash press at 125° C. to provide translucent 4-mil films. Four-inch squares of 65/35 polyester/cotton twill fabric are bonded together using the polymer films as described in Example 1. T-peel strength of the fabric bonds made at 90° C. is 1,405 g/linear cm; for bonds made at 100° C., 1,690 g/linear cm; and for bonds made at 110° C., 1,455 g/linear cm.

Similarly good results are achieved when diethylene glycol is used instead of 1,6-hexanediol.

EXAMPLE 5

The procedure of Example 1 is followed except that 72.0 g (0.50 mole) of 1,4-cyclohexanedimethanol that consists of 95% trans isomer and 5% cis isomer is used instead of the 70% solution of 1,4-cyclohexanedimethanol (70% trans isomer; 30% cis isomer) in methanol. The copolyester contains the following mole percentages of reaction residues: dimethyl adipate, 100 mole %; trans 1,4-cyclohexanedimethanol, 94.4 mole %; cis 1,4-cyclohexanedimethanol, 5.1 mole %; ethylene glycol, 0.5 mole %. The copolyester has an inherent viscosity of 0.6 dl/g, a melting point of 124° C., and a heat of fusion value of 12.0 cal/g.

Samples of this copolyester are compression molded on a Wabash press at 150° C. to provide translucent 4-mil films. Four-inch squares of 65/35 polyester/cotton twill fabric are bonded together using the polymer films as in Example 1 except that 115° C., 125° C., and 135° C. are used as the bonding temperatures. T-peel bond strength of the fabric bonds made at 115° C. is 0.8 pli (150 g/linear cm); for bonds made at 125° C., 8.2 pli (1,470 g/linear cm); and for bonds made at 135° C., 9.6 pli (1,710 g/linear cm).

EXAMPLE 6

The procedure of Example 1 is followed except that 82.7 g (0.475 mole) of dimethyl adipate and 4.9 g (0.025 mole) of dimethyl terephthalate are used. The copolyester contains the following mole percentages of reaction residues: dimethyl adipate, 95.3 mole %; dimethyl terephthalate, 4.7 mole %; trans 1,4-cyclohexanedimethanol, 72.1 mole %; cis 1,4-cyclohexanedimethanol, 27.4 mole %; ethylene glycol, 0.5 mole %.

The copolyester has an inherent viscosity of 0.7 dl/g. By DSC analysis, the polymer has a glass transition temperature of −22° C., a melting point of 98° C., and a heat of fusion value of 6.4 cal/g.

Samples of this copolyester are compression molded on a Wabash press at 130° C. to provide translucent 4-mil films. Four-inch squares of 65/35 polyester/cotton twill fabric are bonded together using the polymer films as described in Example 1. The T-peel strength of the fabric bonds made at 100° C. is 7.5 pli (1,341 g/linear cm); for bonds made at 110° C., the peel strength is 9.2 pli (1,644 g/linear cm).

Physical properties as expressed herein are measured as follows:
Modulus—ASTM D882
Tensile Yield Strength—ASTM D882
Tensile Break Strength—ASTM D882
Elongation—ASTM D882

The "melting point" ($T_m$) and $T_g$ of the polymers described in this application are readily obtained with a Differential Scanning Calorimeter.

The "heat of fusion" $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in Journal of Applied Polymer Science 20, 1209 (1976). Measurement of $\Delta H_f$ is also described in DuPont Thermal analysis Bulletin No. 900-8 (1965). Qualitatively it is possible to compare the degree of crystallinity of polymers by comparing their $\Delta H_f$ values.

Inherent viscosity (I.V.) is measured at 25° C. using 0.50 gram of copolyester per 100 ml of a solvent consisting of 60 wt % phenol and 40 wt % tetrachloroethane.

Melt viscosities are measured in a Brookfield Thermosel viscometer at 190° C.

The strength of the bonds is determined by the so-called "Peel Test" based on a modification (i.e., three test specimens) of the ASTM "T-Peel Test" set forth on pages 63 and 64 of the 1964 edition of the *Book of ASTM Standards*, published by the American Society for Testing Materials, and more specifically identified as Test Number D-1876-61-T.

Unless otherwise specified, all parts, percentages, ratios, etc., are by weight.

If desired, conventional antioxidants, stabilizers, colorants, plasticizers or other additives normally used with polymeric materials may be used in the copolymers of this invention.

The invention has been described in detail with particular reference to preferred embodiments thereof, but it will be understood that variations and modifications can be effected with the spirit and scope of the invention.

We claim:

1. A linear, essentially crystalline, thermoplastic copolyester having an I.V. of about 0.4–1.2 and a melting point of about 60°–130° C., said copolyester having repeat units from about 70.5–100 mole % adipic acid, about 29.5–0 mole % of a co-acid selected from the group consisting of aliphatic, cycloaliphatic and aromatic dibasic acids having 4 to 12 carbon atoms, about 70–99.5 mole % 1,4-cyclohexanedimethanol and about 30–0.5 mole % of aliphatic coglycol having 2–8 carbon atoms, said copolyester having a bonding temperature of about 90°–120° C.

2. A copolyester according to claim 1 having repeat units from essentially 100 mole % adipic acid.

3. A copolyester according to claim 1 having repeat units from up to about 29.5 mole % of a co-acid selected from the group consisting of succinic, glutaric, azelaic, sebacic, 1,12-dodecanedioic, 1,4-cyclohexanedicarboxylic, 1,3-cyclohexanedicarboxylic, terephthalic and isophthalic acid.

4. A copolyester according to claim 1 wherein said other aliphatic glycol is selected from the group consisting of ethylene glycol, diethylene glycol, propylene glycol, 1,3-propanediol, 1,4-butanediol, 1,5-pentanediol, and 1,6-hexanediol.

5. A copolyester according to claim 1 wherein the total of said co-acid and co-glycol is no greater than 30 mole %.

6. Substrates adhered together by the copolyester of claim 1.

7. Substrates adhered together by the copolyester of claim 5.

* * * * *